United States Patent [19]

Schär

[11] Patent Number: 4,458,556
[45] Date of Patent: Jul. 10, 1984

[54] BICYCLE PEDAL WITHOUT HOOK-LIKE ATTACHMENT

[76] Inventor: Hugo Schär, Neftenbach, Switzerland

[21] Appl. No.: 457,659

[22] Filed: Jan. 13, 1983

Related U.S. Application Data

[63] Continuation of Ser. No. 189,021, Sep. 22, 1980, abandoned.

[30] Foreign Application Priority Data

Sep. 20, 1980 [CH]  Switzerland .................... 8477/79

[51] Int. Cl.³ .............................................. G05G 1/14
[52] U.S. Cl. ................................................. 74/594.6
[58] Field of Search ........................... 74/594.4, 594.6; 36/131

[56] References Cited

U.S. PATENT DOCUMENTS

| 2,542,548 | 2/1951 | Mathias et al. ..................... 74/594.4 |
| 3,842,688 | 10/1974 | Baginski .............................. 74/594.6 |

FOREIGN PATENT DOCUMENTS

| 259019 | 5/1949 | Fed. Rep. of Germany . |
| 554227 | 7/1923 | France . |
| 998319 | 1/1952 | France . |
| 57111 | 9/1952 | France ............................. 74/594.6 |
| 1043447 | 11/1953 | France . |
| 2192525 | 8/1974 | France . |
| 2338840 | 8/1977 | France . |
| 2353431 | 12/1977 | France ............................. 74/594.4 |
| 259019 | 5/1949 | Switzerland ...................... 74/594.4 |
| 290481 | 8/1953 | Switzerland ...................... 74/594.6 |
| 4399 | of 1882 | United Kingdom .............. 74/594.6 |
| 14936 | of 1888 | United Kingdom .............. 74/594.6 |
| 20289 | 10/1895 | United Kingdom .............. 74/594.6 |
| 24100 | of 1906 | United Kingdom .............. 74/594.6 |
| 25068 | of 1908 | United Kingdom .............. 74/594.6 |
| 485748 | 5/1938 | United Kingdom .............. 74/594.6 |
| 618383 | 10/1946 | United Kingdom . |
| 624048 | 5/1949 | United Kingdom . |
| 664492 | 10/1950 | United Kingdom . |
| 871876 | 7/1961 | United Kingdom .............. 74/594.6 |
| 1130971 | 10/1968 | United Kingdom . |

Primary Examiner—Lawrence J. Staab
Attorney, Agent, or Firm—Ernest F. Marmorek

[57] ABSTRACT

A bicycle pedal mechanism that is free of any hook-like toe support includes a pedal that is rotatable about an axis, and a strap that is apt to receive the foot or footwear of a bicyclist; the strap is connected to the pedal at a predetermined spacing from the axis in a measured direction that faces away from the toe; and there is provided a pedal extension that is secured to a rear portion of the pedal; so that any torque generated by an upward movement of the pedal about the axis is taken up by a rearward portion of the foot or footwear through the pedal extension.

5 Claims, 3 Drawing Figures

BICYCLE PEDAL WITHOUT HOOK-LIKE ATTACHMENT

This is a continuation of application Ser. No. 189,021, filed Sept. 22, 1980 now abandoned.

BACKGROUND OF THE INVENTION

The present invention relates to a bicycle pedal free of any hook-like attachment, in particular a bicycle pedal used for racing purposes.

A bicyclist participating in races, in contrast to a bicyclist using the bicycle for transportation purposes, as is known, transfers his muscular energy not only by pressing down on the pedal during the downward directed movement thereof, but simultaneously pulls up the oppositely disposed pedal, which at the rear moves in an upward direction. In order to be able to transfer the tractive force from the shoe, or foot, onto the pedal, the known conventional bicycle pedals used for bicycle racing, in contrast to the general bicycle pedals, include a so-called racing-hook, the purpose of which is to prevent a forward tilting of the pedal during the pulling-up movement.

However, such pedals have a number of disadvantages for the bicyclist. Due to the flexibility of the hook-like attachment, the shoe has a tendency to lift off in front from the pedal support during the pulling-up movement. Due to alternating effects of traction and pressure, the hook-like attachment frequently tends to break as a result of fatigue. Furthermore, through the force of the ascending rear cross-piece, which force bends the shoe sole in upward direction with each tractive movement, the shoe likewise has a tendency to crack within a short period of time.

A further disadvantage of the known pedal is due to the fact that the slot-shaped recessed area provided in the shoe sole, which prevents the shoe from sliding out of the hook-like attachment during the upward movement of the pedal, can fill up with small rocks and dirt when walking, so that prior to a bicyclist climbing onto the bicycle, this recessed area has to be frequently cleaned.

Another disadvantage results also from the fact that during the frontward tilting of the pedal, at the beginning of the tractive motion, the distance between pedal and the ground decreases and accordingly, when riding along curves, dangerous contacts with the ground take place, which can lead to a fall of the bicyclist.

It is an object of the invention to transfer the forces acting on the pedal during the alternation between a compressive force and a tractive force into a movement free from any play between the shoe and the pedal.

It is a further object of the invention to transfer, in particular, any tractive forces onto the pedal, without the use of a racing hook, which has a tendency to break.

It is another object of the invention to maintain the distance between the pedal and the ground surface as large as possible.

It is a further object of the invention to devise a pedal so that a simple but accurately directed shoe guidance results which is not sensitive to dirt.

SUMMARY OF THE INVENTION

These objects are attained by the bicycle pedal designed in accordance with the instant invention.

The advantages of the solution in accordance with the invention, lie in particular in the simplicity of the pedal, which ensures a connection free of any play, between the shoe and the pedal, and accurately guides the shoe, and moreover is absolutely insensitive to dirt.

A further advantage of the invention is attained by the torque transferred during the tractive motion from the pedal onto the shoe, not exerting any undesired stresses on the shoe or on the shoe sole.

BRIEF DESCRIPTION OF THE DRAWING

The invention will be described in more detail by means of an illustrated exemplified embodiment.

DESCRIPTION OF THE PREFERRED EMBODIMENTS

Figure 1:
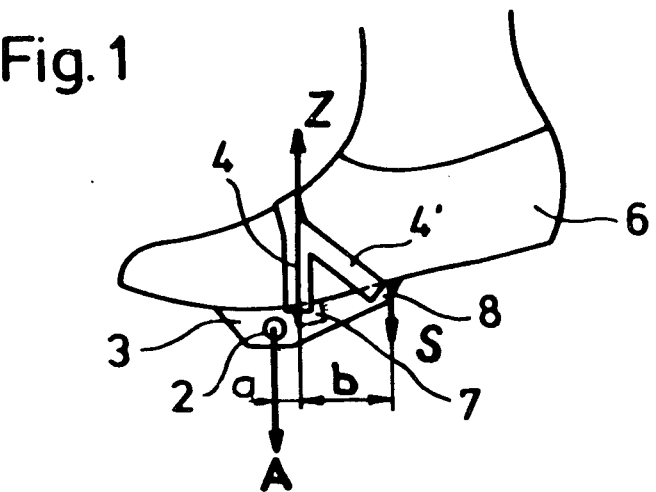
FIG. 1 is a side view of the pedal with shoe.

At the end of a treadle 1, which is constructed in a known manner, an axle 2 is inserted. On the axle 2, a pedal 3 is mounted in a pivotable manner by means of a first strapping means such as a retaining strap 4 and a recessed area or borehole 5 is provided for the up-take of a guide-lug (not illustrated), which lug is, in turn, affixed to the sole of shoe 6. A second strapping means such as an auxiliary strap 4' prevents the strap 4 from gliding in forward direction along the shoe 6. It will be understood that in place of the auxiliary strap 4', a holding device for the strap 4 can also be provided on the shoe 6, or the strap 4 can be formed in such a wide manner, that its displacement on the shoe is not possible. It is also conceivable to provide the strap 4 with a buckle, which allows an individual adjustment of the strap length, and consequently allows an individual adjustment of the play of the shoe on the pedal. Behind the axle 2, the pedal 3 includes a pedal-extension element or shoe-support surface 8, in order to be able to take up a torque D acting on the shoe 6 without any play and so that the torque taken up is distributed over a large area of the shoe sole, when the pedal is pulled in upward direction. Torque A.a supplied by the pedal about an axis coinciding approximately with the lowermost portion of the strap 4 bordering the shoe sole, as seen from FIG. 1, in turn results in a torque S.b about the same axis, and acting on the shoe 6. A is the vertical component of the pedal axle force and a the separation distance thereof from the aforenoted axis, the normal upward force component Z passing through the axis coinciding with the lowermost portion of the strap 4. S is the force or load exerted on the pedal shoe-support surface 8 by the shoe 6, and b the separation distance from the axis to the effective point on the shoe-support surface 8 through which the force S passes. The force Z equals the sum of the instantaneous forces A+S. In order to provide a simplified explanation, only the most important force-components and torques were taken into consideration and subordinate quantities were omitted).

The pedal 3 is advantageously forged from a light metal alloy or is produced through injection molding. The axle 2 can be housed directly within the pedal 3 through the use of roller bearings 9, 10. This form of construction makes possible the use of an antifriction or a needle-type bearing 10 at the outer side of the pedal. By this means the pedal cross-section can be very greatly reduced, which allows the bicycle racer to tilt the bicycle to a greater extent when riding along curves, or the bicycle racer can also continue to pedal the bicycle in curves along which he rides at a very fast speed, without running the risk of touching the ground with the pedal and falling down as a result of it.

Figure 2:
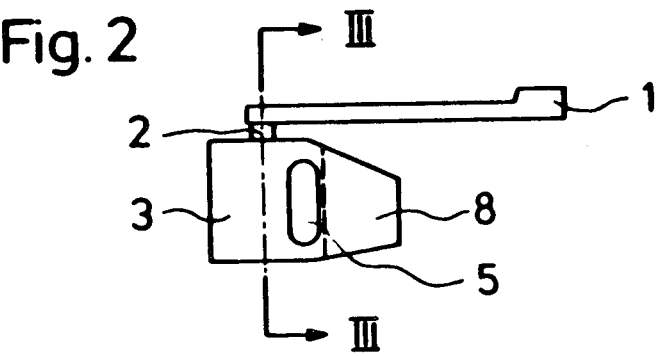
FIG. 2 is a plan view of the pedal.
Figure 3:
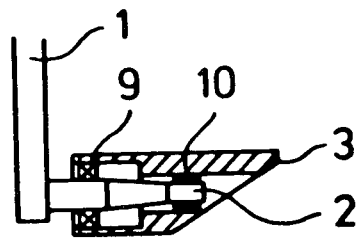
FIG. 3 is a cross-section along line III—III of FIG. 2.

In a further form of construction of the invention, the pedal 3 can be constructed in two parts by the extension element 8 being connected in an adjustable manner by means of a joint to the pedal 3, as indicated in FIG. 2 by a dot-dash line, so as to obtain an optimum support of shoe 6 on the pedal element 3 and the pedal extension element 8.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A bicycle pedal mechanism for use by a bicyclist each foot of whom is clad in a footwear, said mechanism being free of any hook-like toe support, comprising, a pedal rotatable about an axis of rotation, said pedal having a pedal extension projecting rearwardly of said axis, first strapping means for receiving the footwear of the bicyclist and being connected to the pedal at a predetermined spacing from said axis in a rearward direction, and second strapping means for preventing forward sliding of said first strapping means, said second strapping means being connected to said first strapping means, and to said pedal extension at a location rearwardly of the connection of said first strapping means to said pedal, whereby any torque of the pedal about said axis generated by an upward movement of the foot fitting said first and second strapping means, is taken up by a rearward portion of the footwear through said pedal extension and said first and second strapping means.

2. A mechanism as claimed in claim 1, wherein said pedal has a groove adapted to receive a projection disposed on said footwear, so as to be registered therewith.

3. A mechanism as claimed in claim 2, wherein said projection is a lug, and said groove extends in a direction substantially at right angles to said rearward direction and receives said lug.

4. A mechanism as claimed in claim 1, wherein the pedal in a direction outwardly with respect to the bicycle throughout includes an oblique surface that commences at the outer edge of the upper surface of the pedal including the extension thereof, whereby the danger of contact between the pedal and the ground in a curve is reduced.

5. A bicycle pedal mechanism as claimed in claim 1, wherein said first strapping means is enlarged in the rearward direction so as to include the second strapping means in a single combined strapping means.

* * * * *